(12) United States Patent
Sakashita et al.

(10) Patent No.: US 10,733,449 B2
(45) Date of Patent: Aug. 4, 2020

(54) MONITORING SYSTEM FOR DETECTING CONSECUTIVE EVENTS

(71) Applicant: KYOCERA Document Solutions Inc., Osaka (JP)

(72) Inventors: Fumiya Sakashita, Osaka (JP); Yoichi Hiranuma, Osaka (JP); Shoichi Sakaguchi, Osaka (JP); Shohei Fujiwara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/174,640

(22) Filed: Oct. 30, 2018

(65) Prior Publication Data

US 2019/0138808 A1    May 9, 2019

(30) Foreign Application Priority Data

Nov. 6, 2017    (JP) .................................. 2017-213696

(51) Int. Cl.
  *G06K 9/00* (2006.01)
  *H04N 7/18* (2006.01)
  *G08B 13/196* (2006.01)

(52) U.S. Cl.
  CPC ...... *G06K 9/00711* (2013.01); *G06K 9/00771* (2013.01); *H04N 7/181* (2013.01); *G06K 2009/00738* (2013.01); *G08B 13/196* (2013.01)

(58) Field of Classification Search
  CPC ........... G06K 9/00711; G06K 9/00771; G06K 2009/00738; H04N 7/181; G08B 13/196
  USPC ....................................................... 348/159
  See application file for complete search history.

(56) References Cited

U.S. PATENT DOCUMENTS

| 2005/0088295 | A1* | 4/2005 | Kondo ............. G08B 13/19641 340/517 |
| 2019/0068829 | A1* | 2/2019 | Van Schoyck ......... G05D 1/101 |
| 2019/0304275 | A1* | 10/2019 | Taki ................. G08B 13/19682 |

FOREIGN PATENT DOCUMENTS

| CN | 101571982 A | 11/2009 |
| JP | 2012-099940 A | 5/2012 |

OTHER PUBLICATIONS

An Office Action mailed by the State Intellectual Property Office of the People's Republic of China dated Apr. 30, 2020, which corresponds to Chinese Patent Application No. 201811266682.5 and is related to U.S. Appl. No. 16/174,640 with English language translation.

* cited by examiner

*Primary Examiner* — Marnie A Matt
(74) *Attorney, Agent, or Firm* — Studebaker & Brackett PC

(57) ABSTRACT

A monitoring system includes an imaging device, a controller, storage, and a notifying section. The imaging device captures an image of an imaging area to generate captured image data indicating a captured image. The controller detects events based on the captured image data. The events include a pre-event and a post-event detected after the pre-event has ended. The controller changes a first flag from an off state to an on state upon detecting the pre-event, and holds the first flag in the on state even after the pre-event has ended. The controller changes the second flag from the off state to the on state upon detecting the post-event, and directs the notifying section to notify of consecutive event occurrence information indicating that consecutive events have occurred.

7 Claims, 14 Drawing Sheets

MONITORING SYSTEM FOR DETECTING CONSECUTIVE EVENTS

INCORPORATION BY REFERENCE

The present application claims priority under 35 U.S.C. § 119 to Japanese Patent Application No. 2017-213696, filed on Nov. 6, 2017. The contents of this application are incorporated herein by reference in their entirety.

BACKGROUND

The present disclosure relates to a monitoring system.

A monitoring camera system includes a network camera and a display device. The network camera includes an imaging system, a control system, and a communication section. The imaging system includes an image acquiring section and a video distribution controller. The image acquiring section acquires an image captured by an image sensor. The video distribution controller transmits a video obtained by encoding the captured image to the display device. The control system includes an object detection processing section, an event detection processing section, and an event distribution controller. The object detection processing section detects an object such as a human body. The event detection processing section detects occurrence of an event such as "removal" or "tampering (imaging obstruction)" based on a state of the object detected by the object detection processing section. The condition of the object is expressed by an object coverage rate indicating what percentage of a predetermined area of a screen is occupied by the object, for example. The event distribution controller generates event information according to a detection result of the event detection processing section. The communication section transmits the event information generated by the event distribution controller to the display device.

SUMMARY

A monitoring system according to an aspect of the present disclosure detects events. The monitoring system includes an imaging device, a controller, storage, and a notifying section. The imaging device captures an image of an imaging area to generate captured image data indicating a captured image. The controller detects the events based on the captured image data. The storage stores data indicating a first flag and a second flag. The notifying section notifies of information. The events include a pre-event and a post-event detected after the pre-event has ended. The first flag and the second flag are both in an off state before the pre-event is detected. The controller changes the first flag from the off state to an on state upon detecting the pre-event, and holds the first flag in the on state even after the pre-event has ended. The controller changes the second flag from the off state to the on state upon detecting the post-event, and directs the notifying section to notify of consecutive event occurrence information indicating that consecutive events have occurred.

DETAILED DESCRIPTION

Embodiments of a monitoring system according to the present disclosure will be described as follows with reference to the accompanying drawings. Note that elements within the drawings that are the same or equivalent are labeled with the same reference signs and description thereof will not be repeated.

First Embodiment

Figure 1:
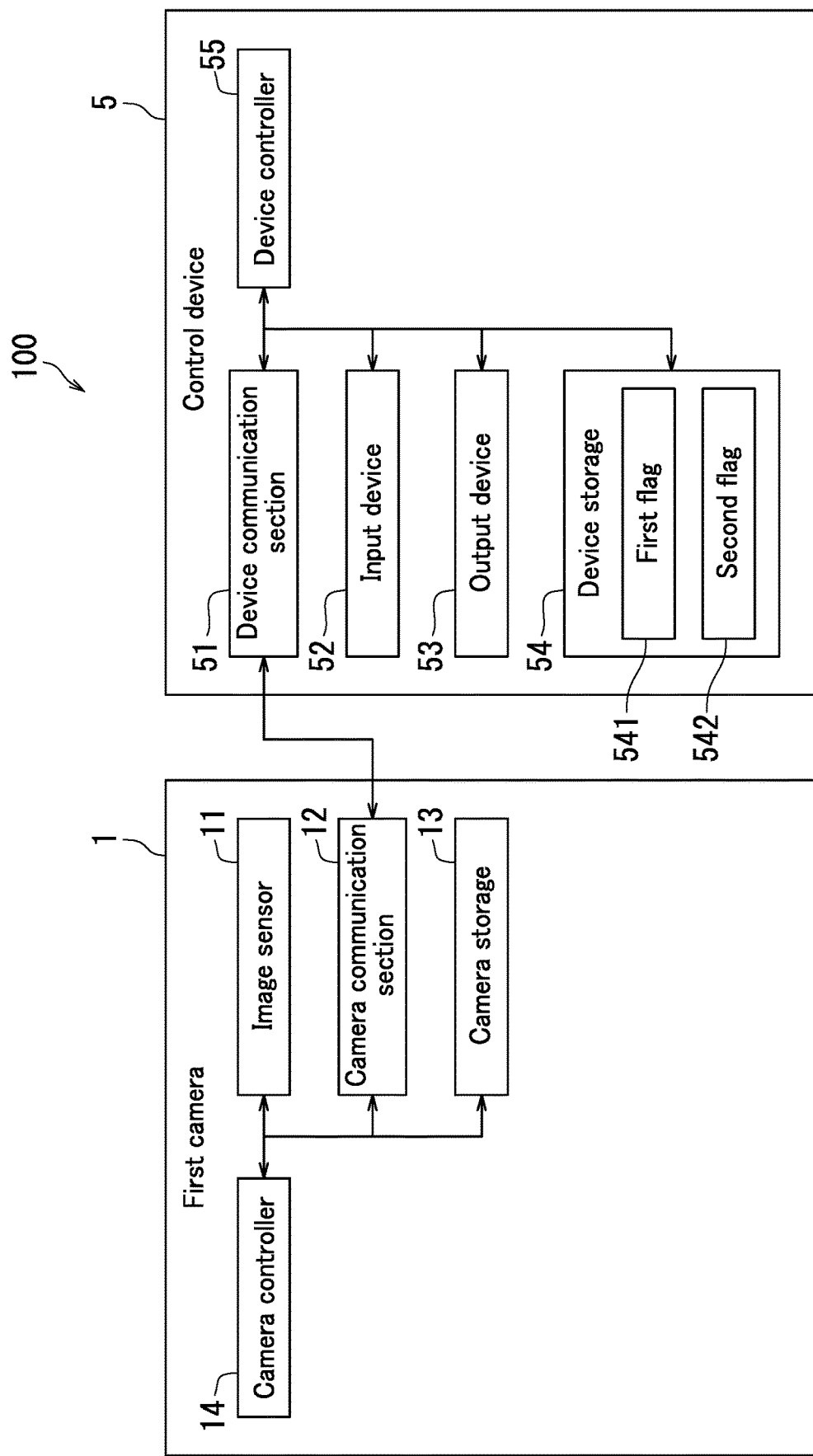
FIG. 1 is a diagram illustrating a configuration of a monitoring system according to a first embodiment of the present disclosure.

First, a monitoring system 100 according to a first embodiment of the present disclosure will be described with reference to FIG. 1. FIG. 1 is a diagram illustrating a configuration of the monitoring system 100 according to the first embodiment.

As illustrated in FIG. 1, the monitoring system 100 includes a first camera 1 and a control device 5. The first camera 1 is an example of a first imaging device.

The first camera 1 includes an image sensor 11, a camera communication section 12, camera storage 13, and a camera controller 14. The camera controller 14 is an example of a controller.

The image sensor 11 captures an image of an imaging area. The image sensor 11 generates data indicating a captured image, and sends the data to the camera controller 14. In the following, the data indicating the captured image is referred to as "captured image data". The image sensor 11 is a charge-coupled device (CCD) image sensor or a complementary metal-oxide-semiconductor (CMOS) image sensor, for example.

The camera communication section 12 can communicate with an electronic device equipped with a communication device that uses the same communication method (protocol). The camera communication section 12 communicates with the control device 5 through a network such as a local area network (LAN). The camera communication section 12 is a communication module (communication device) such as a LAN board, for example. In the present embodiment, the camera communication section 12 transmits the captured image data to the control device 5.

The camera storage 13 stores various data. The camera storage 13 includes semiconductor memory. The semiconductor memory is random-access memory (RAM) and read-only memory (ROM), for example.

The camera controller 14 controls operation of each section included in the first camera 1 by executing a camera control program stored in the camera storage 13. The camera controller 14 includes a processor such as a microprocessing unit (MPU), for example.

The camera controller 14 detects a change to the captured image in a detection range based on the captured image data. The camera controller 14 detects the change to the captured image by a background subtraction method, for example. Alternatively, the camera controller 14 detects the change to the captured image by an inter-frame difference method, for example. The detection range is preset by an administrator. Data indicating the detection range is stored in the camera storage 13.

In the present embodiment, the camera controller 14 transmits change detection data to the control device 5 upon detecting the change to the captured image in the detection range. The change detection data indicates detection of a change to the captured image data in the detection range.

The control device 5 includes a device communication section 51, an input device 52, an output device 53, device storage 54, and a device controller 55. The device communication section 51 and the output device 53 are an example of a notifying section. The device storage 54 is an example of storage. The device controller 55 is an example of a controller. The control device 5 is a server, for example.

The device communication section 51 can communicate with an electronic device equipped with a communication device that uses the same communication method (protocol). The device communication section 51 communicates with the camera communication section 12 through the network such as a LAN. The device communication section 51 is a communication module (communication device) such as a LAN board, for example. In the present embodiment, the device communication section 51 receives the captured image data from the camera communication section 12. The device communication section 51 also receives the change detection data from the camera communication section 12 when the camera controller 14 detects a change to the captured image.

The input device 52 receives input of an instruction of a user for the control device 5. In the present embodiment, the input device 52 is a keyboard and a mouse. Note that the input device 52 may include a touch sensor.

The output device 53 outputs the captured image based on the captured image data received by the device communication section 51. In the present embodiment, the output device 53 includes a display such as a liquid-crystal display.

The device storage 54 stores various data. The device storage 54 includes a storage device and semiconductor memory. The storage device includes either or both of a hard disk drive (HDD) and a solid-state drive (SSD), for example. The semiconductor memory includes RAM and ROM, for example. In the present embodiment, the device storage 54 stores data indicating a first flag 541 and a second flag 542. In the following, the data indicating the first flag 541 will be referred to as "first flag data" and the data indicating the second flag 542 will be referred to as "second flag data". The first flag 541 and the second flag 542 each change between an on state and an off state.

The device storage 54 stores recognition image data and reference background data. The recognition image data indicates an image for recognizing an object preset as a detection target by the administrator. The reference background data indicates a reference background image serving as a reference of the captured image. In the present embodiment, the reference background image indicates a state of the imaging area captured by the first camera 1 before the detection target is placed.

The device controller 55 controls operation of each section included in the control device 5 by executing a device control program stored in the device storage 54. The device controller 55 includes a processor such as a central processing unit (CPU), for example.

The device controller 55 receives the setting of the detection range and the detection target by the administrator. The device controller 55 displays a setting screen for setting the detection range and the detection target on the output device 53, for example. The administrator sets the detection target and the detection range surrounding the detection target by operating the input device 52 when the setting screen is displayed. The data indicating the detection range is transmitted to the camera communication section 12 through the device communication section 51. The camera controller 14 stores the data indicating the detection range in the camera storage 13 when the camera communication section 12 receives the data indicating the detection range. The camera controller 14 detects a change to the captured image based on the data indicating the detection range stored in the camera storage 13.

The device controller 55 outputs the captured image on the output device 53 based on the captured image data received by the device communication section 51 when the input device 52 receives an instruction to output the captured image. Alternatively, the device controller 55 outputs the captured image on the output device 53 based on the captured image data stored in the device storage 54.

The device controller 55 executes an event detection process to detect an event when the device communication section 51 receives the change detection data. The event detection process includes a pre-event detection process and a post-event detection process. The pre-event detection process is a process for detecting a pre-event. The post-event detection process is a process for detecting a post-event. The post-event detection process is executed after the pre-event has finished. In the present embodiment, the pre-event is an "imaging obstruction act". The post-event is a "detection target removal act". Note that the detection target is an "object placed in a public area", for example.

The device controller 55 executes the event detection process when the device communication section 51 receives the change detection data. In detail, the device controller 55 determines whether or not the first flag 541 is in the off state.

The device controller 55 executes the pre-event detection process and the post-event detection process when determining that the first flag 541 is in the off state. The device controller 55 executes the post-event detection process when determining that the first flag 541 is not in the off state.

In the pre-event detection process, the device controller 55 detects occurrence (existence or lack) of the imaging obstruction act based on a first obstruction area rate D1. In detail, the device controller 55 determines whether or not the first obstruction area rate D1 is equal to or greater than a first threshold. The first threshold is an example of a threshold. The first threshold is preset by the administrator, for example. The first threshold is 70%, for example.

The first obstruction area rate D1 indicates what percentage of the captured image is occupied by a first obstruction area. The first obstruction area is an area in which the imaging obstruction act is taking place. In the present embodiment, the first obstruction area is an area showing an image of an object which obstructs imaging. The object which obstructs imaging is a human body, for example.

The first obstruction area rate D1 is calculated based on the reference background data stored in the device storage 54 and the captured image data. In detail, the first obstruction area rate D1 is a percentage of the captured image data that does not match the reference background data. Specifically, the first obstruction area rate D1 indicates a percentage of the number of pixels in the captured image that differ from pixels constituting the reference background image. The device controller 55 calculates the first obstruction area rate D1 by comparing the captured image to the reference background image indicated by the reference background data through pattern matching, for example.

The device controller 55 determines that occurrence of the imaging obstruction act has been detected (the pre-event has been detected) upon determining that the first obstruction area rate D1 is equal to or greater than the first threshold, and changes the first flag 541 to the on state from the off state. The device controller 55 also stores the captured image data in the device storage 54 upon changing the first flag 541 to the on state. Note that the device controller 55 executes the post-event detection process without changing the first flag 541 to the on state upon determining that the first obstruction area rate D1 is less than the first threshold.

In the post-event detection process, the device controller 55 determines whether or not a detection target image 3 is included in the captured image by searching for the detection target image 3 in the captured image based on the recognition image data stored in the device storage 54. Specifically, the device controller 55 determines whether or not the detection target image 3 is included in the captured image by comparing the captured image data to the recognition image data. More specifically, the device controller 55 determines whether or not the detection target image 3 is included in the captured image depending on whether or not the captured image includes an image that matches a recognition image indicated by the recognition image data at a percentage equal to or greater than a second threshold. The second threshold is preset by the administrator, for example. The second threshold is 70%, for example.

Figure 2:
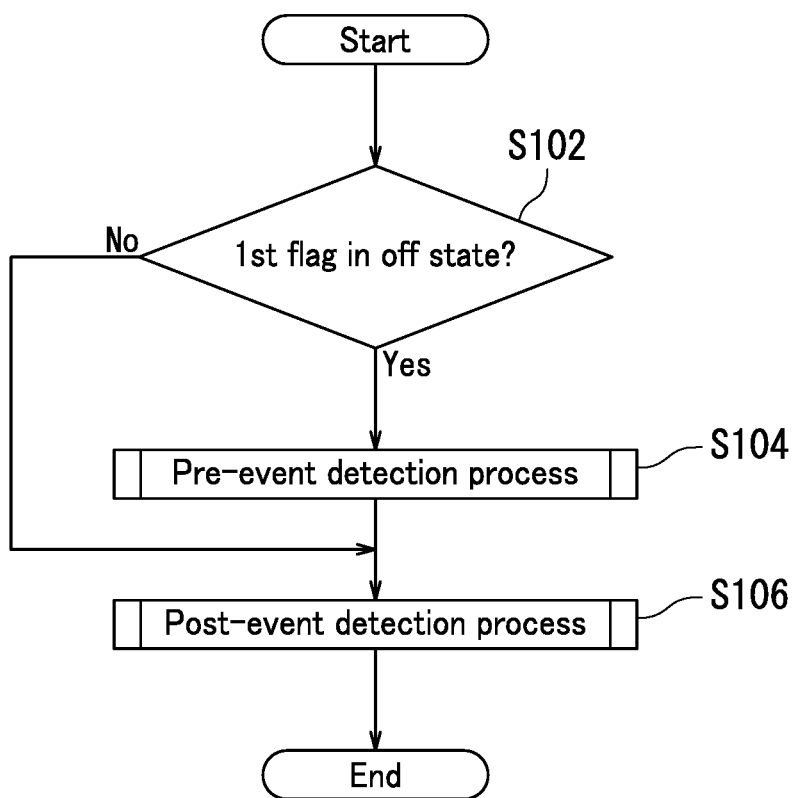
FIG. 2 is a flowchart illustrating an event detection process according to the first embodiment of the present disclosure.

Upon determining that the detection target image 3 is not included in the captured image, the device controller 55 determines that occurrence of the detection target removal act has been detected (the post-event has been detected) and changes the second flag 542 from the off state to the on state. The device controller 55 notifies the administrator of "consecutive event occurrence information" upon changing the second flag 542 to the on state while the first flag 541 is in the on state. The consecutive event occurrence information indicates that consecutive events have occurred. In the present embodiment, the device controller 55 outputs a message indicating the consecutive event occurrence information to the output device 53. By contrast, upon determining that the detection target image 3 is included in the captured image, the device controller 55 determines that the detection target removal act is not occurring (the post-event has not been detected). The device controller 55 changes the first flag 541 from the on state to the off state without changing the second flag 542 to the on state upon determining that the detection target removal act is not occurring while the first flag 541 is in the on state. The device controller 55 deletes the captured image data stored in the device storage 54 when changing the first flag 541 to the off state. Next, the event detection process according to the first embodiment will be further described with reference to FIGS. 1 and 2. FIG. 2 is a flowchart illustrating the event detection process according to the first embodiment. The event detection process is started when the device communication section 51 receives the change detection data.

As illustrated in FIG. 2, the device controller 55 determines whether or not the first flag 541 is in the off state when the device communication section 51 receives the change detection data (Step S102). Upon determining that the first flag 541 is in the off state (Step S102: Yes), the device controller 55 executes the pre-event detection process (Step S104). Next, the device controller 55 executes the post-event detection process (Step S106) and ends the event detection process. Upon determining that the first flag 541 is not in the off state by contrast (Step S102: No), the device controller 55 executes the post-event detection process (Step S106) and ends the event detection process.

Figure 3:
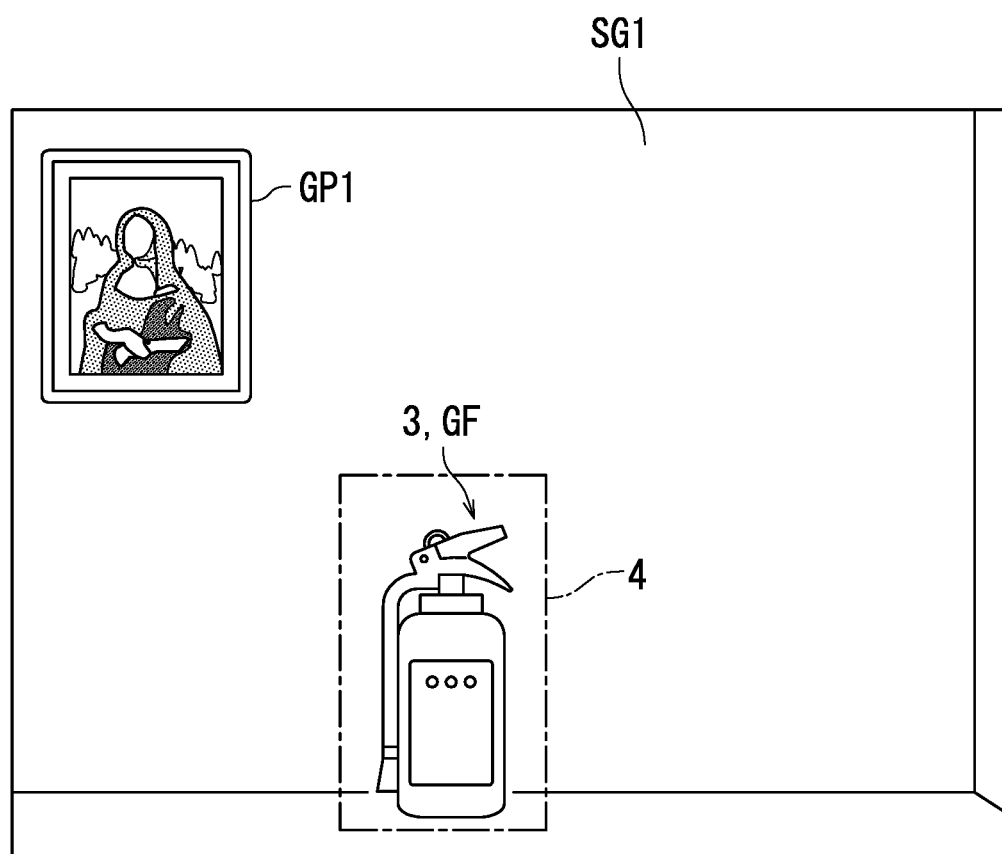
FIG. 3 is a diagram illustrating an example of a captured image according to the first embodiment of the present disclosure.
Figure 4:
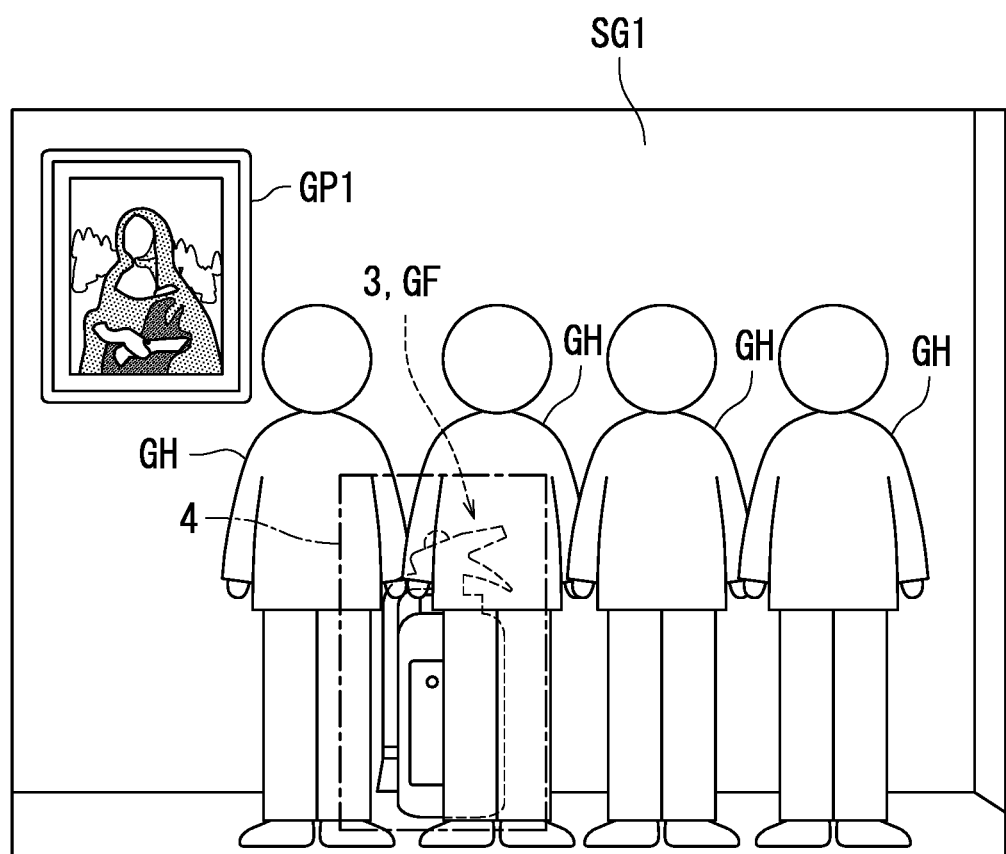
FIG. 4 is a diagram illustrating a first additional example of the captured image according to the first embodiment of the present disclosure.

Next, the pre-event detection process according to the present embodiment will be described with reference to FIGS. 1 and 4. In FIGS. 3 and 4, the imaging obstruction act is detected as the pre-event. Note that before the pre-event is detected, the first flag 541 and the second flag 542 are both in the off state.

FIG. 3 is a diagram illustrating an example of a captured image SG1 according to the first embodiment. FIG. 4 is a diagram illustrating a first additional example of the captured image SG1 according to the first embodiment. In detail, FIG. 4 illustrates the captured image SG1 after a plurality of people has appeared in the imaging area illustrated in FIG. 3. The first obstruction area rate D1 in the captured image SG1 illustrated in FIG. 4 is equal to or greater than the first threshold.

As illustrated in FIG. 3, the captured image SG1 includes a fire extinguisher image GF exhibiting a fire extinguisher and a painting image GP1 exhibiting a painting. In other words, the first camera 1 (image sensor 11) captures an image of an imaging area in which the fire extinguisher and the painting are placed. The administrator sets the detection target (image 3 illustrating the detection target) from among images exhibiting objects included in the captured image SG1 by operating the input device 52. The administrator also sets a detection range 4 surrounding the image 3 illustrating the detection target by operating the input device 52. In the present embodiment, the administrator sets the fire extinguisher as the detection target. In the following, the image 3 illustrating the detection target will be referred to as the "detection target image 3".

As illustrated in FIGS. 3 and 4, human body images GH illustrating a plurality of human bodies appear in the captured image SG1 when the people appear in the imaging area. When the people surround the detection target (fire extinguisher), the captured image SG1 changes in the detection range 4. Accordingly, the camera controller 14 detects a change to the captured image SG1 in the detection range 4 and transmits the change detection data to the device communication section 51 through the camera communication section 12. When the device communication section 51 receives the change detection data, the device controller 55 executes the event detection process. In the example illustrated in FIGS. 3 and 4, the first flag 541 is in the off state. Accordingly, the device controller 55 executes the pre-event detection process. In detail, the device controller 55 calculates the first obstruction area rate D1 based on the reference background data stored in the device storage 54 and the captured image data, and determines whether or not the first obstruction area rate D1 is equal to or greater than the first threshold. In the example illustrated in FIG. 4, the first obstruction area rate D1 is equal to or greater than the first threshold. Accordingly, the device controller 55 detects occurrence of the imaging obstruction act. Upon detecting occurrence of the imaging obstruction act (pre-event), the device controller 55 changes the first flag 541 from the off state to the on state and ends the pre-event detection process.

Figure 5:
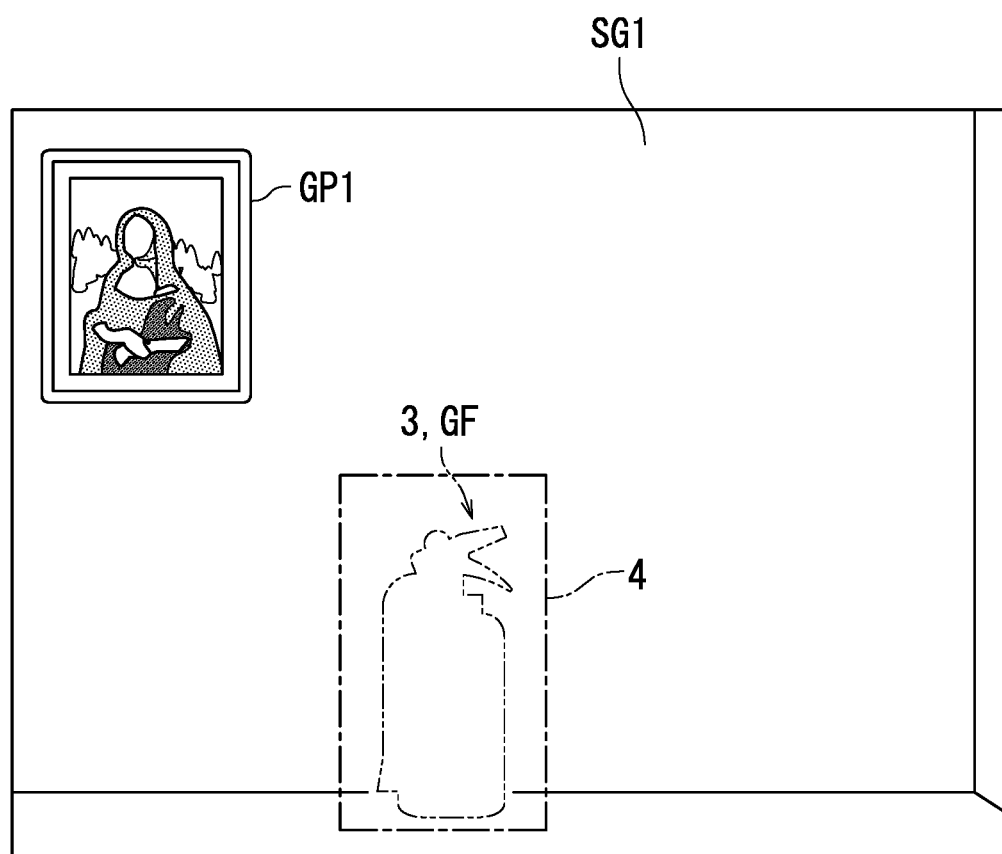
FIG. 5 is a diagram illustrating a second additional example of the captured image according to the first embodiment of the present disclosure.

Next, the post-event detection process according to the present embodiment will be described with reference to FIGS. 1 to 5. In FIG. 5, the detection target removal act is detected as the post-event.

Figure 6:
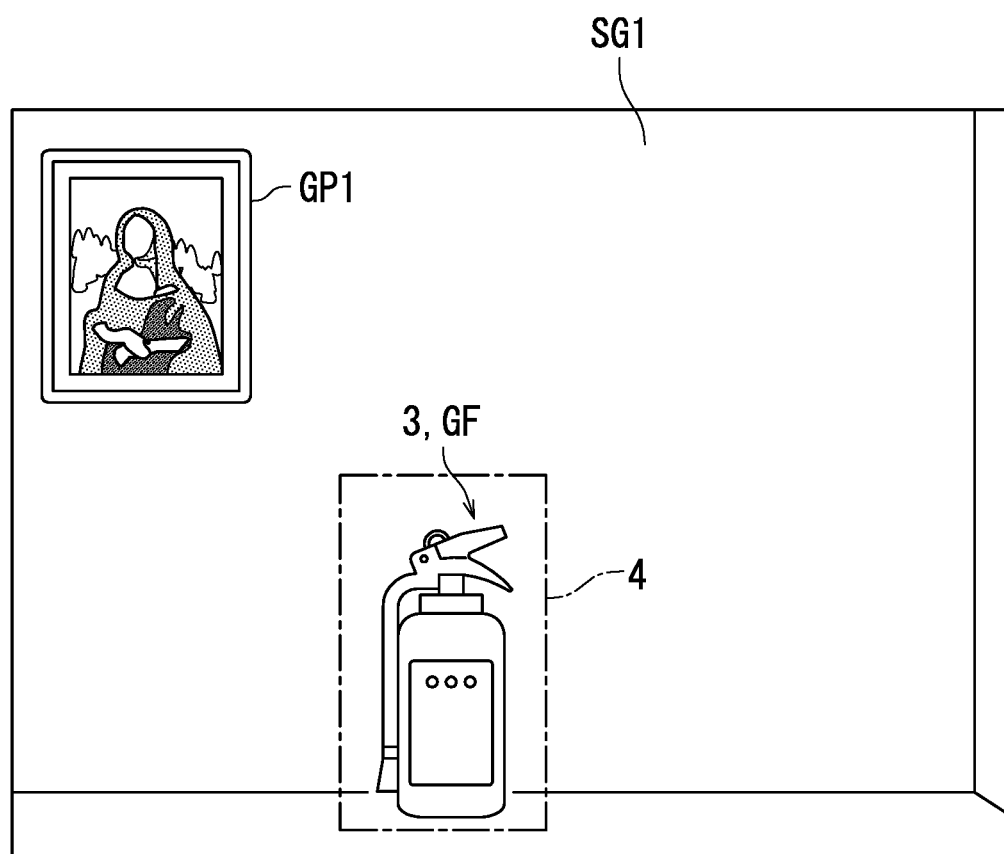
FIG. 6 is a diagram illustrating a third additional example of the captured image according to the first embodiment of the present disclosure.

FIG. 5 is a diagram illustrating a second additional example of the captured image SG1 according to the first embodiment. FIG. 6 is a diagram illustrating a third additional example of the captured image SG1 according to the first embodiment. In detail, FIGS. 5 and 6 illustrate the captured image SG1 after the people have left the imaging area illustrated in FIG. 4. In other words, FIGS. 5 and 6 illustrate the captured image SG1 after the imaging obstruction act has ended. Note that in the example illustrated in FIGS. 5 and 6, the first obstruction area rate D1 of the captured image SG1 is less than the first threshold because the people have left. Also, the first flag 541 is in the on state and the second flag 542 is in the off state. Note that dashed and double dotted lines illustrated in FIG. 5 indicate the detection target image 3 before being removed.

As illustrated in FIGS. 4 to 6, the captured image SG1 changes in the detection range 4 when the people leave the imaging area and the human body images GH disappear from the captured image SG1. Accordingly, the camera controller 14 detects a change to the captured image SG1 in the detection range 4 and transmits the change detection data to the device communication section 51 through the camera communication section 12. When the device communication section 51 receives the change detection data, the device controller 55 executes the event detection process. In the example illustrated in FIGS. 4 to 6, the first flag 541 is in the on state. Accordingly, the device controller 55 executes the post-event detection process. In detail, the device controller 55 compares the captured image data to the recognition image data and determines whether or not the detection target image 3 is included in the captured image SG1 depending on whether or not the captured image SG1 includes an image with the percentage of match to the recognition image equal to or greater than the second threshold.

As illustrated in FIG. 5, the device controller 55 detects occurrence of the detection target removal act (post-event) when the captured image SG1 does not include an image with the percentage of match to the recognition image equal to or greater than the second threshold. Upon detecting occurrence of the detection target removal act, the device controller 55 changes the second flag 542 from the off state to the on state. Upon changing the second flag 542 to the on state, the device controller 55 notifies the administrator of the consecutive event occurrence information and ends the post-event detection process.

Note that as illustrated in FIG. 6, the device controller 55 ends the post-event detection process without notifying of the consecutive event occurrence information when the captured image SG1 includes an image with the percentage of match to the recognition image equal to or greater than the second threshold.

Figure 7:
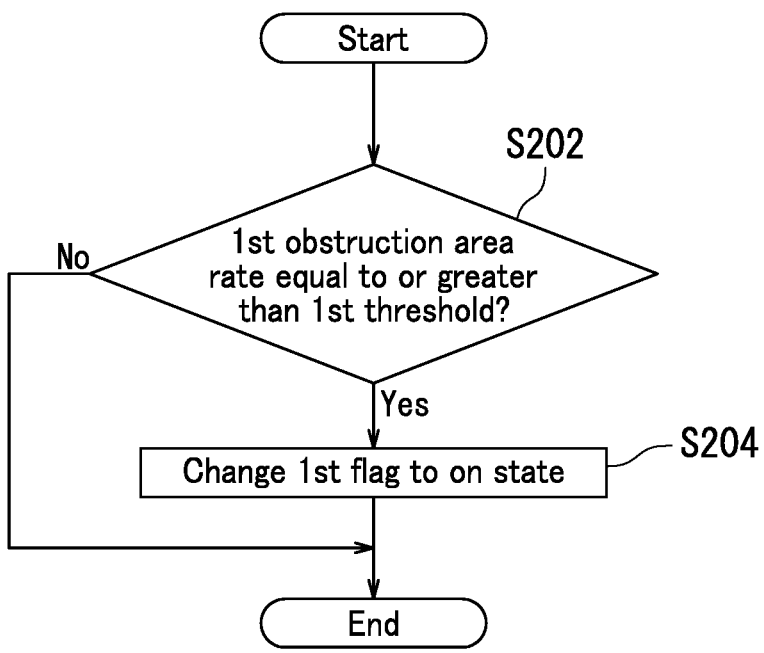
FIG. 7 is a flowchart illustrating a pre-event detection process according to the first embodiment of the present disclosure.

Next, the pre-event detection process according to the first embodiment will be further described with reference to FIGS. 1 to 7. FIG. 7 is a flowchart illustrating the pre-event detection process according to the first embodiment. The pre-event detection process is started when the device controller 55 determines that the first flag 541 is in the off state (Step S102 in FIG. 2: Yes).

As illustrated in FIG. 7, upon determining that the first flag 541 is in the off state, the device controller 55 determines whether or not the first obstruction area rate D1 is equal to or greater than the first threshold (Step S202). Upon determining that the first obstruction area rate D1 is equal to or greater than the first threshold (Step S202: Yes), the device controller 55 determines that the imaging obstruction act has been detected, changes the first flag 541 to the on state (Step S204), and ends the pre-event detection process. Upon determining that the first obstruction area rate D1 is less than the first threshold by contrast (Step S202: No), the device controller 55 ends the pre-event detection process without changing the first flag 541 to the on state.

Figure 8:
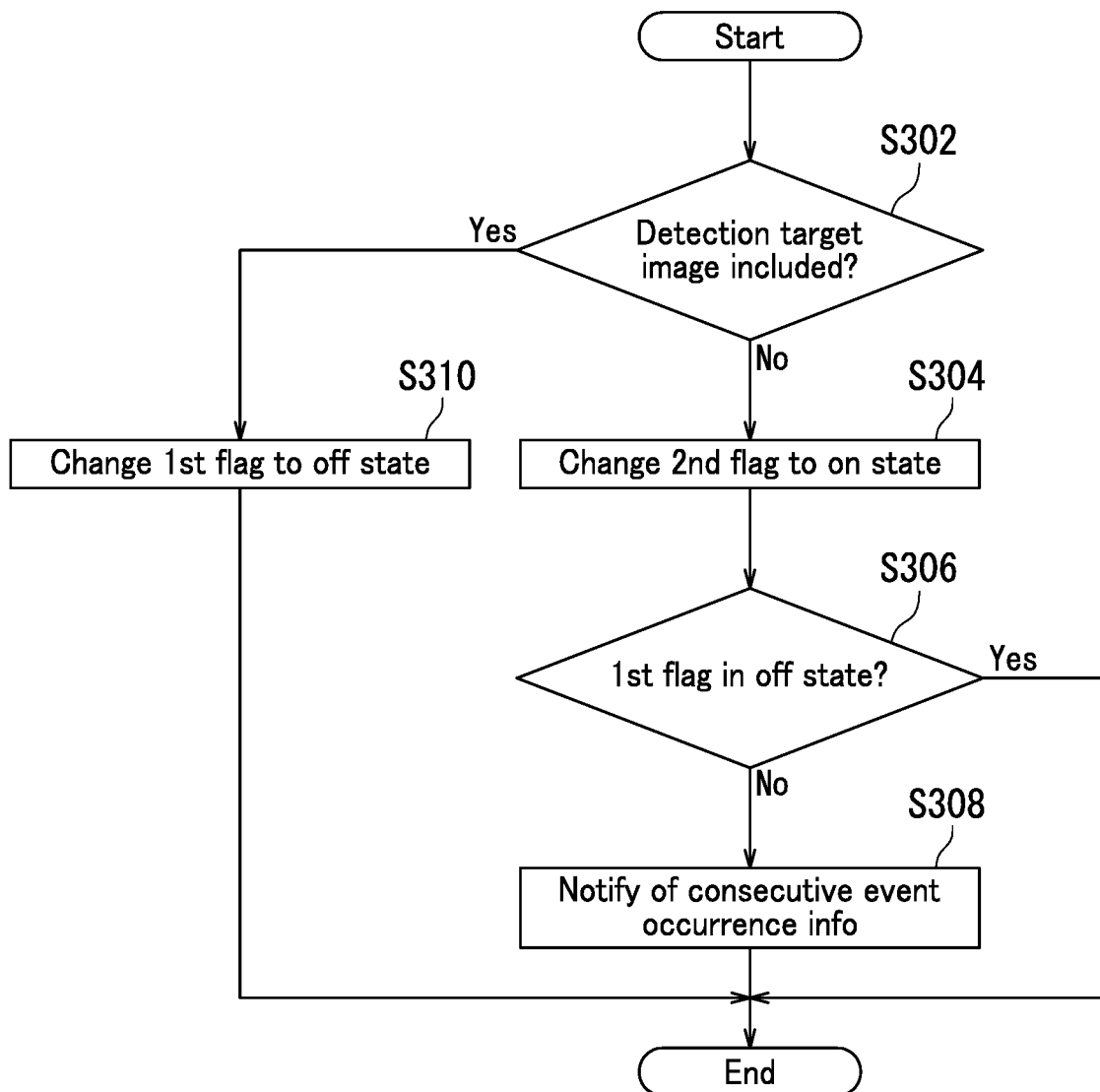
FIG. 8 is a flowchart illustrating a post-event detection process according to the first embodiment of the present disclosure.

Continuing, the post-event detection process according to the first embodiment will be further described with reference to FIG. 8. FIG. 8 is a flowchart illustrating the post-event detection process according to the first embodiment. The post-event detection process is started when the pre-event detection process ends (Step S104 in FIG. 2). Alternatively, the post-event detection process is started when the first flag 541 is determined not to be in the off state in the event detection process (Step S102 in FIG. 2: No).

As illustrated in FIG. 8, the device controller 55 determines whether or not the detection target image 3 is included in the captured image SG1 (Step S302). In detail, the device controller 55 determines whether or not the detection target image 3 is included in the captured image SG1 depending on whether or not the captured image SG1 includes an image with the percentage of match to the recognition image indicated by the recognition image data equal to or greater than the second threshold exists.

Upon determining that the detection target image 3 is not included in the captured image SG1 (Step S302: No), the device controller 55 determines that the detection target removal act has occurred and changes the second flag 542 to the on state (Step S304). Next, the device controller 55 determines whether or not the first flag 541 is in the off state (Step S306). Upon determining that the first flag 541 is not in the off state (Step S306: No), the device controller 55 notifies the administrator of the consecutive event occurrence information (Step S308). In detail, the device controller 55 directs the output device 53 to output a message indicating the consecutive event occurrence information, and ends the post-event detection process. Upon determining that the first flag 541 is in the off state by contrast (Step S306: Yes), the device controller 55 ends the post-event detection process without notifying of the consecutive event occurrence information.

Upon determining that the detection target image 3 is included in the captured image SG1 by contrast (Step S302: Yes), the device controller 55 changes the first flag 541 to the off state (Step S310) and ends the post-event detection process.

Figure 9:
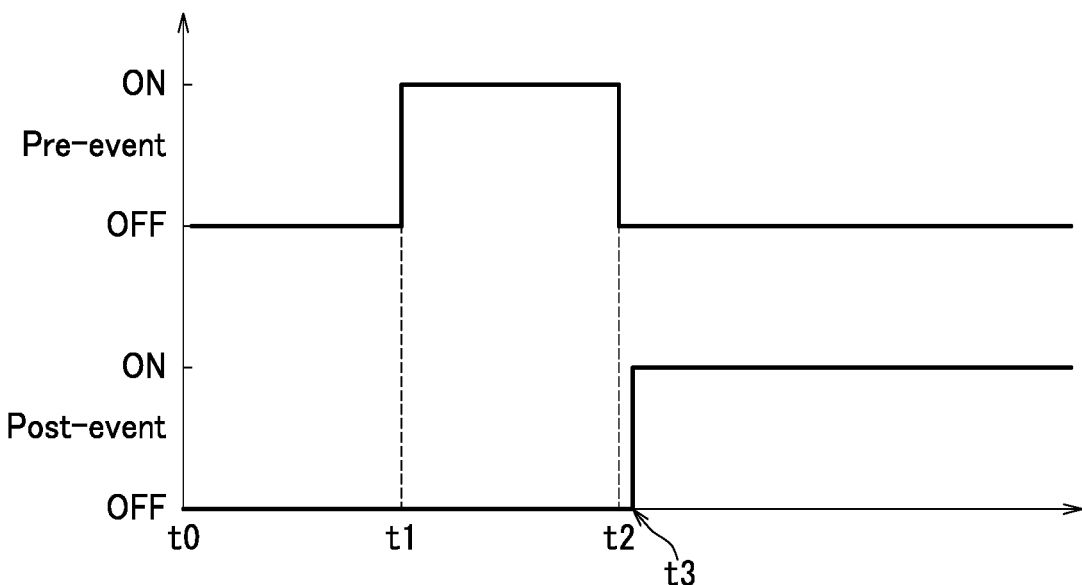
FIG. 9 is a diagram illustrating a timing of event detection and a timing of notification according to the first embodiment of the present disclosure.

Continuing, a relationship between a timing of event detection and a timing of notification according to the first embodiment will be described with reference to FIG. 9. FIG. 9 is a diagram illustrating the timing of event detection and the timing of notification according to the first embodiment. In detail, FIG. 9 illustrates the relationship between the timing of event notification and the notification of the consecutive event occurrence information. Note that a horizontal axis illustrated in FIG. 9 indicates time (t).

As illustrated in FIG. 9, the pre-event and the post-event have not occurred at a time t0. At the time t0, the first flag 541 and the second flag 542 are in the off state. At a time t1, the pre-event occurs and is detected. At a time t2, the pre-event ends. At a time t3, the post-event occurs and is detected.

When an event (pre-event) occurs at the time t1, the pre-event detection process is executed and the first flag 541 changes from the off state to the on state.

When the pre-event ends at the time t2, the state of the first flag 541 is held as is (the first flag 541 is held in the on state), and the post-event detection process is executed. As a result, the second flag 542 is changed from the off state to the on state, and the administrator is notified of the consecutive event occurrence information. That is, in the present embodiment, the administrator is notified of the consecutive event information when the post-event is detected after the pre-event has ended.

Next, a relationship between a timing of event detection and a timing of notification according to a comparative example will be described with reference to FIG. 10. As described in the comparative example, a second event is detected as an event after a first event has ended.

Figure 10:
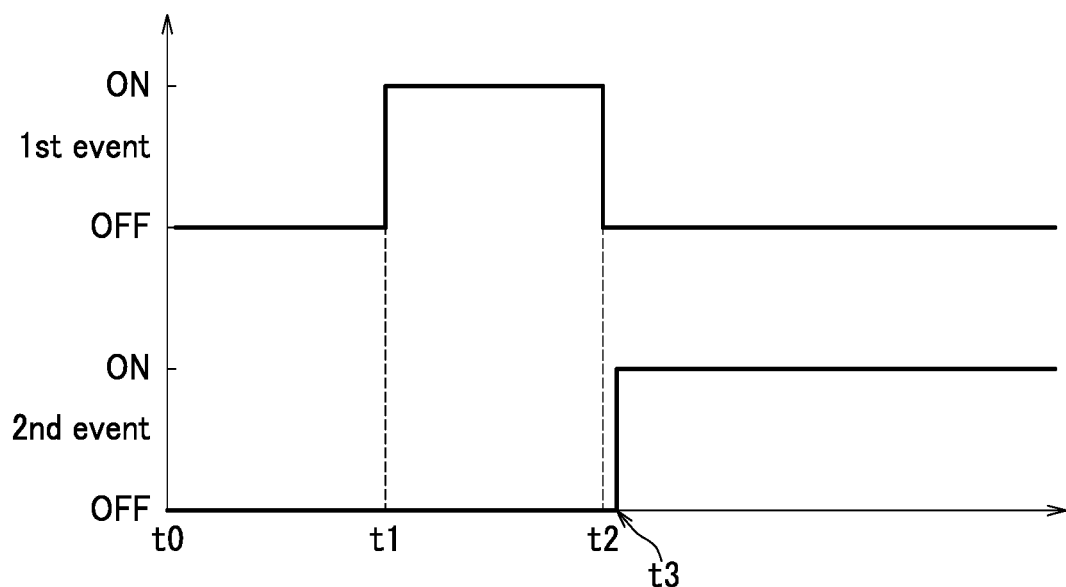
FIG. 10 is a diagram illustrating a timing of event detection and a timing of notification according to a comparative example of the present disclosure.

FIG. 10 is a diagram illustrating the timing of event detection and the timing of notification according to the comparative example. In the comparative example, the administrator sets an OR condition or an AND condition as a notification condition for executing the notification. The OR condition is a condition under which the notification is executed when at least one of the first event and the second event is detected. The AND condition is a condition under which the notification is executed when both the first event and the second event are detected.

As illustrated in FIG. 10, in a case in which the OR condition is set as the notification condition in the comparative example, the administrator is to be notified of information indicating the event detection when the first event is detected and when the second event is detected. That is, in the case in which the OR condition is set as the notification condition in the comparative example, the administrator is to be notified of the information indicating event detection each time an event is detected. Accordingly, information notifying the administrator becomes excessive, and a burden of confirmation work for the administrator increases. As a result, there arises a concern that important information may be overlooked.

In a case in which the AND condition is set as the notification condition in the comparative example, the administrator is not notified of the information indicating the event detection because the second event is not detected in a period (t1 to t2) in which the first event is detected. Also, the administrator is not notified of the information indicating event detection even when the second event is detected because the detection of the first event is ended before the second event is detected. Accordingly, in the case in which the AND condition is set as the notification condition in the comparative example, there arises a concern that the administrator will not be notified of information indicating an important event and event detection accuracy will decrease.

By contrast, in the present embodiment, when the post-event is detected after detection of the pre-event has ended, the administrator is notified of the consecutive event occurrence information only once. The post-event is an event detected after the pre-event has ended. In the present embodiment, when the post-event is not detected, the administrator is not notified of the consecutive event occurrence information. Accordingly, even when the imaging obstruction act has been detected because people have appeared (crowded), for example, the administrator is not notified of the consecutive event occurrence information when it is possible to determine that the detection target (fire extinguisher) removal act has not occurred after the pre-event has ended (after the people have left). By contrast, the administrator is notified of the consecutive event occurrence information when the detection target removal act is occurring after the pre-event has ended (after the people have left). Therefore, according to the present embodiment, the event detection accuracy can be prevented from decreasing while reducing a work burden of the administrator.

The comparative example illustrated in FIG. 10 describes a configuration in which the captured image data is stored in a storage area when an event is detected and the captured image data is deleted from the storage area when event detection has finished. When the OR condition is set as the detection condition in such a configuration, the captured image data from the moment when the first event is detected has already been deleted from the storage area at the moment when the administrator is notified of the second event. Accordingly, the administrator cannot ascertain a state of the capture image or the imaging area before occurrence of the second event based on the captured image data. In the case in which the AND condition is set as the notification condition in the comparative example illustrated in FIG. 10, the captured image data of when the first event occurs and the captured image data of when the second event occurs is not stored in the storage area. As a result, there arises a concern that the administrator cannot discern a cause of the event.

By contrast, the device controller 55 changes the first flag 541 to the on state upon detecting the pre-event and stores the captured image data in the device storage 54 in the present embodiment. The captured image data is held in the device storage 54 until the first flag 541 is changed to the off state. The first flag 541 is also held in the on state until the device controller 55 determines that the detection target removal act is not occurring. In other words, the captured image data is stored in the device storage 54 until the device controller 55 determines that the detection target removal act is not occurring. Accordingly, the concern that an occurrence cause of an event cannot be discerned is reduced.

The first embodiment has been described above. According to the present embodiment, the event detection accuracy can be prevented from decreasing while reducing the work burden of the administrator.

Note that in the present embodiment, the device controller 55 executes the pre-event detection process upon receiving the change detection data, but the device controller 55 may determine whether or not an object obstructing imaging is a moving object and execute the pre-event detection process only when the object obstructing imaging is a moving object.

Also in the present embodiment, the device controller 55 executes the post-event detection process when the pre-event detection process ends, but the device controller 55 may execute the post-event detection process according to detection target information pre-stored in the device storage 54, for example. Specifically, the detection target information indicates whether or not the detection target can be removed by an outside party. The device controller 55 determines whether or not the detection target information indicates that the detection target can be removed by the outside party. The device controller 55 executes the post-event detection process upon determining that the detection target information indicates that the detection target can be removed by the outside party. By contrast, the device controller 55 does not execute the post-event detection process upon determining that the detection target information does not indicate that the detection target can be removed by the outside party.

Also in the present embodiment, the device controller 55 executes the event detection process, but the camera controller 14 may alternatively execute the event detection process (pre-event detection process and post-event detection process).

Also in the present embodiment, an example has been described in which the pre-event is the imaging obstruction act and the post-event is the detection target removal act, but no limitation is placed on the post-event other than being an event that is detected after the pre-event has ended. For example, in a case in which the first camera 1 includes an automatic tracking function which changes the imaging area, the pre-event may be execution of the automatic tracking function and the post-event may be the detection target removal act.

Also in the present embodiment, the device controller 55 changes the first flag 541 to the off state upon detecting that the detection target image 3 is included in the captured image SG1, but the device controller 55 may also change the first flag 541 to the off state after a predetermined period has elapsed from determining that the detection target image 3 is included in the captured image SG1. The predetermined period is arbitrarily set by the administrator. The predetermined period is three seconds, for example.

Second Embodiment

Continuing, a monitoring system 100 according to a second embodiment will be described with reference to FIGS. 11 to 15. The second embodiment differs from the first embodiment in that there is a plurality of cameras in the second embodiment. A pre-event detection process according to the second embodiment also differs from that of the first embodiment. Items of the second embodiment that differ from the first embodiment will be described in the following, and description of items that are shared with the first embodiment will be omitted.

Figure 11:
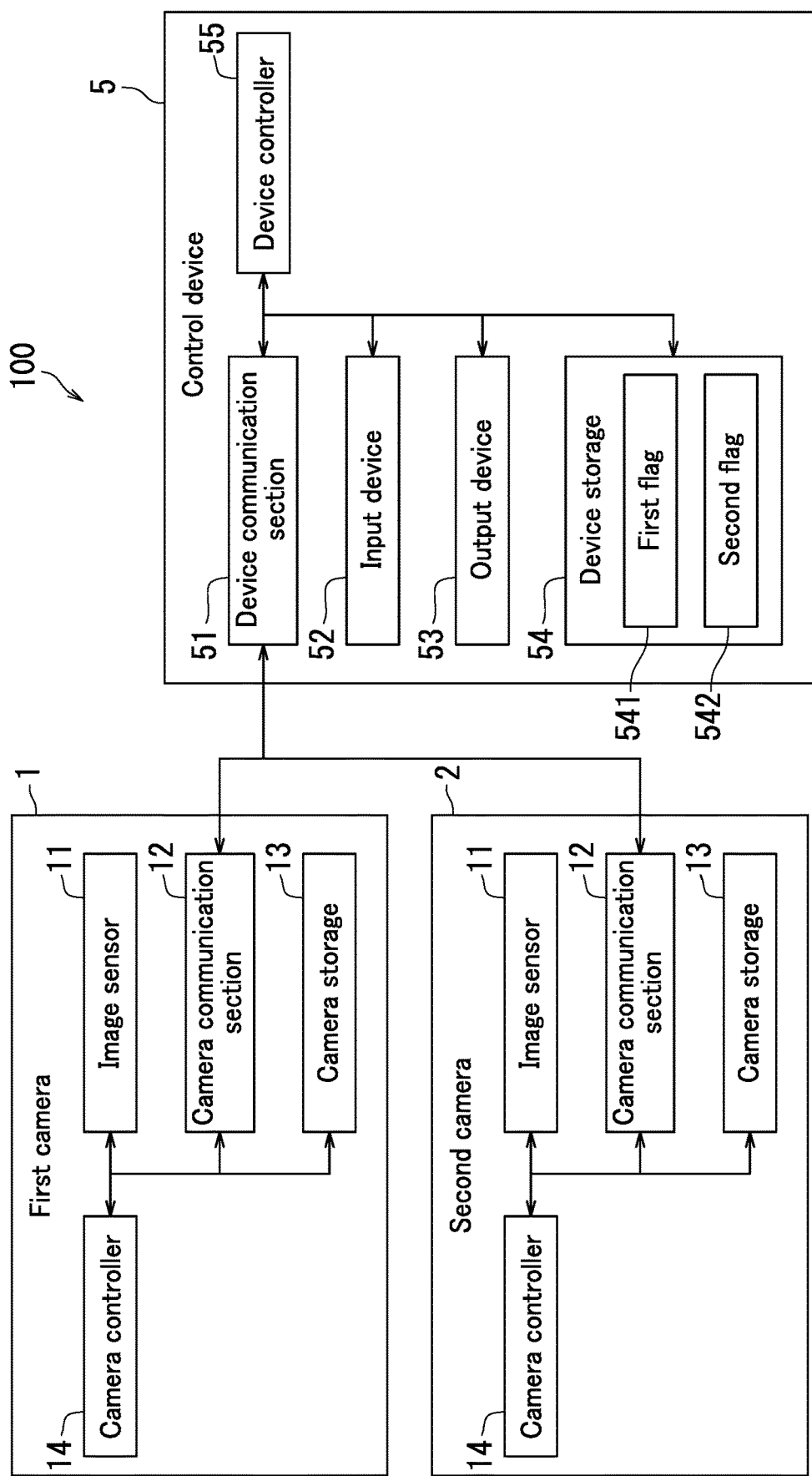
FIG. 11 is a diagram illustrating a configuration of a monitoring system according to a second embodiment of the present disclosure.

First, a configuration of the monitoring system 100 according to the second embodiment will be described with reference to FIG. 11. FIG. 11 is a diagram illustrating the configuration of the monitoring system 100 according to the second embodiment. As illustrated in FIG. 11, the monitoring system 100 further includes a second camera 2. The second camera 2 captures an image of a different imaging area than a first camera 1. In the following, the imaging area of the first camera 1 will be referred to as a "first imaging area" and the imaging area of the second camera 2 will be referred to as a "second imaging area". Also, a captured image SG1 captured by the first camera 1 will be referred to as a "first captured image SG1" and a captured image SG2 captured by the second camera 2 will be referred to as a "second captured image SG2". Note that in the present embodiment, the first imaging area and the second imaging area are adjacent but do not overlap with each other. Also note that the second camera 2 is an example of a second imaging device.

As illustrated in FIG. 11, the second camera 2 includes an image sensor 11, a camera communication section 12, camera storage 13, and a camera controller 14.

A configuration of the image sensor 11, the camera communication section 12, the camera storage 13, and the camera controller 14 included in the second camera 2 is substantially the same as a configuration of the image sensor 11, the camera communication section 12, the camera storage 13, and the camera controller 14 included in the first camera 1. Therefore, description of the configuration of the image sensor 11, the camera communication section 12, the camera storage 13, and the camera controller 14 included in the second camera 2 will be omitted.

The camera communication section 12 included in the second camera 2 transmits captured image data to a device communication section 51. The camera controller 14 of the second camera 2 transmits change detection data to the device communication section 51 through the camera communication section 12 of the second camera 2 upon detecting a change in the second captured image SG2.

In the present embodiment, the device storage 54 further stores reference background data indicating a background image serving as a reference for the second captured image SG2. In the following, a reference background image for the first captured image SG1 will be referred to as a "first reference background image" and data indicating the first reference background image will be referred to as "first reference background data". Also, a reference background image for the second captured image SG2 will be referred to as a "second reference background image" and data indicating the second reference background image will be referred to as "second reference background data".

A device controller 55 executes the pre-event detection process based on first captured image data and second captured image data. In detail, the device controller 55 calculates a second obstruction area rate D2 in a similar manner to the first obstruction area rate D1 described in the first embodiment (refer to FIG. 1), and detects a pre-event based on the first obstruction area rate D1 and the second obstruction area rate D2. The second obstruction area rate D2 indicates what percentage of the second captured image SG2 is occupied by a second obstruction area. The second obstruction area is an area in which an imaging obstruction act is taking place. In the present embodiment, the second obstruction area is an area showing an image of an object obstructing imaging. The object obstructing imaging is a human body, for example.

The second obstruction area rate D2 is calculated based on the second reference background data stored in the device storage 54 and the captured image data. In detail, the second obstruction area rate D2 is a percentage of the second captured image data that does not match the second reference background data. Specifically, the second obstruction area rate D2 indicates a percentage of the number of pixels in the second captured image SG2 that differ from pixels constituting the second reference background image. The device controller 55 calculates the second obstruction area rate D2 by comparing the second captured image SG2 to the reference background image indicated by the second reference background data through pattern matching, for example.

In the present embodiment, the device controller 55 detects the imaging obstruction act when the first obstruction area rate D1 is equal to or greater than a first threshold and the second obstruction area rate D2 is less than the first threshold.

Figure 12:
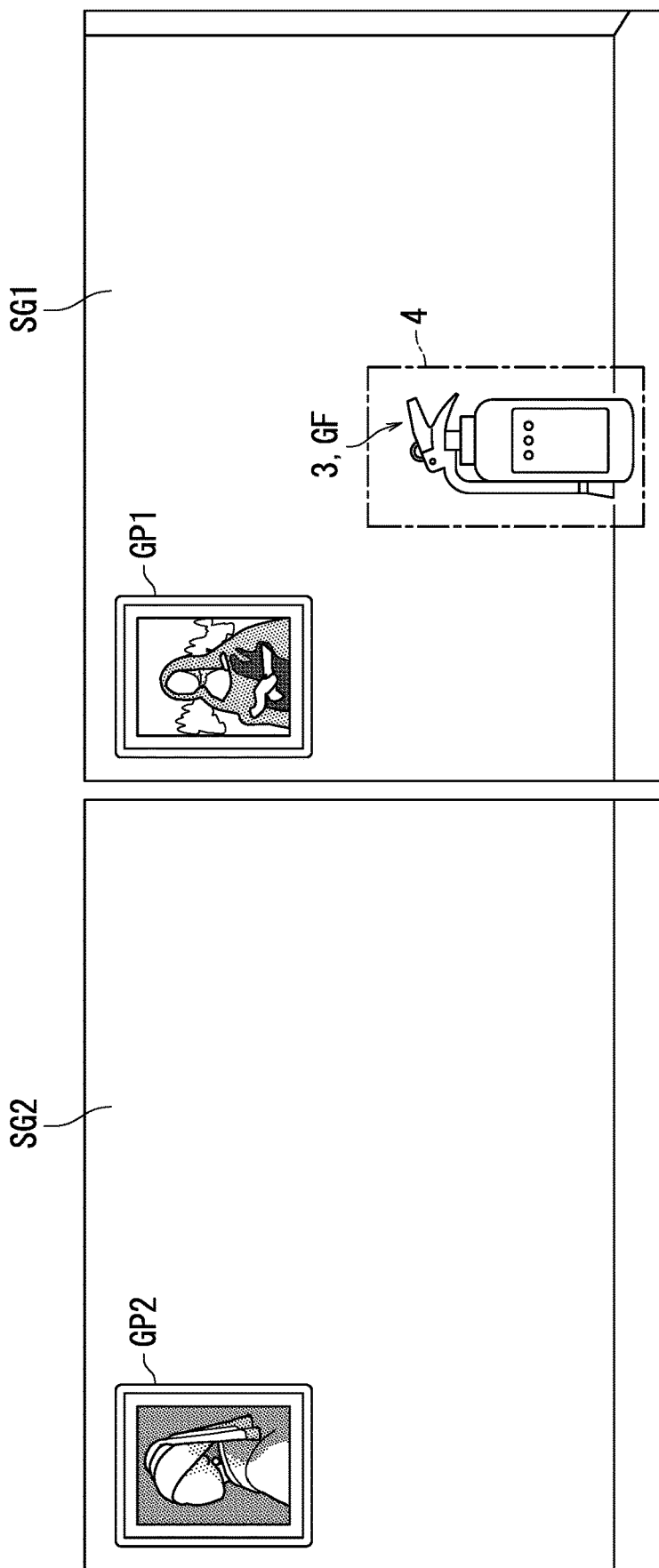
FIG. 12 is a diagram illustrating an example of a first captured image and a second captured image according to the second embodiment of the present disclosure.
Figure 13:
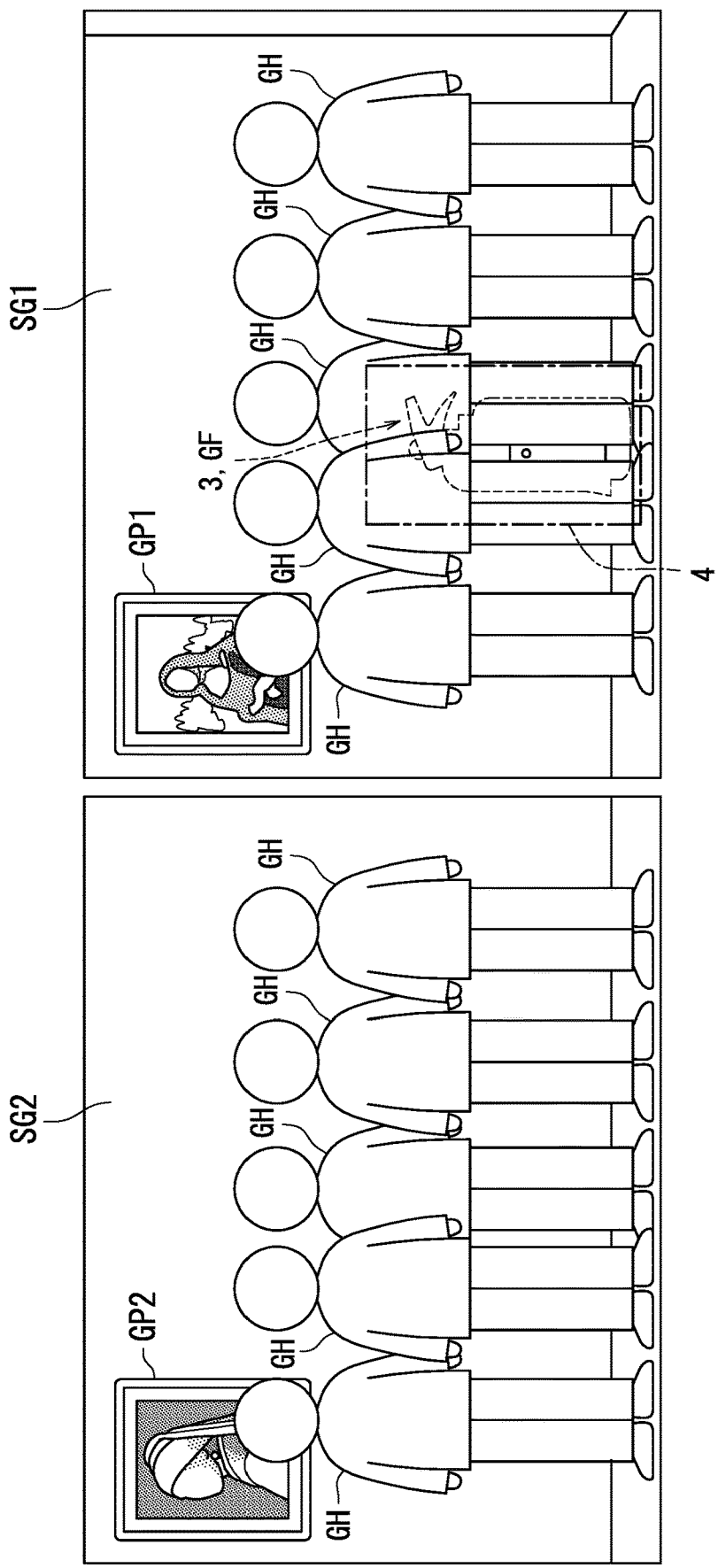
FIG. 13 is a diagram illustrating a first additional example of the first captured image and the second captured image according to the second embodiment of the present disclosure.
Figure 14:
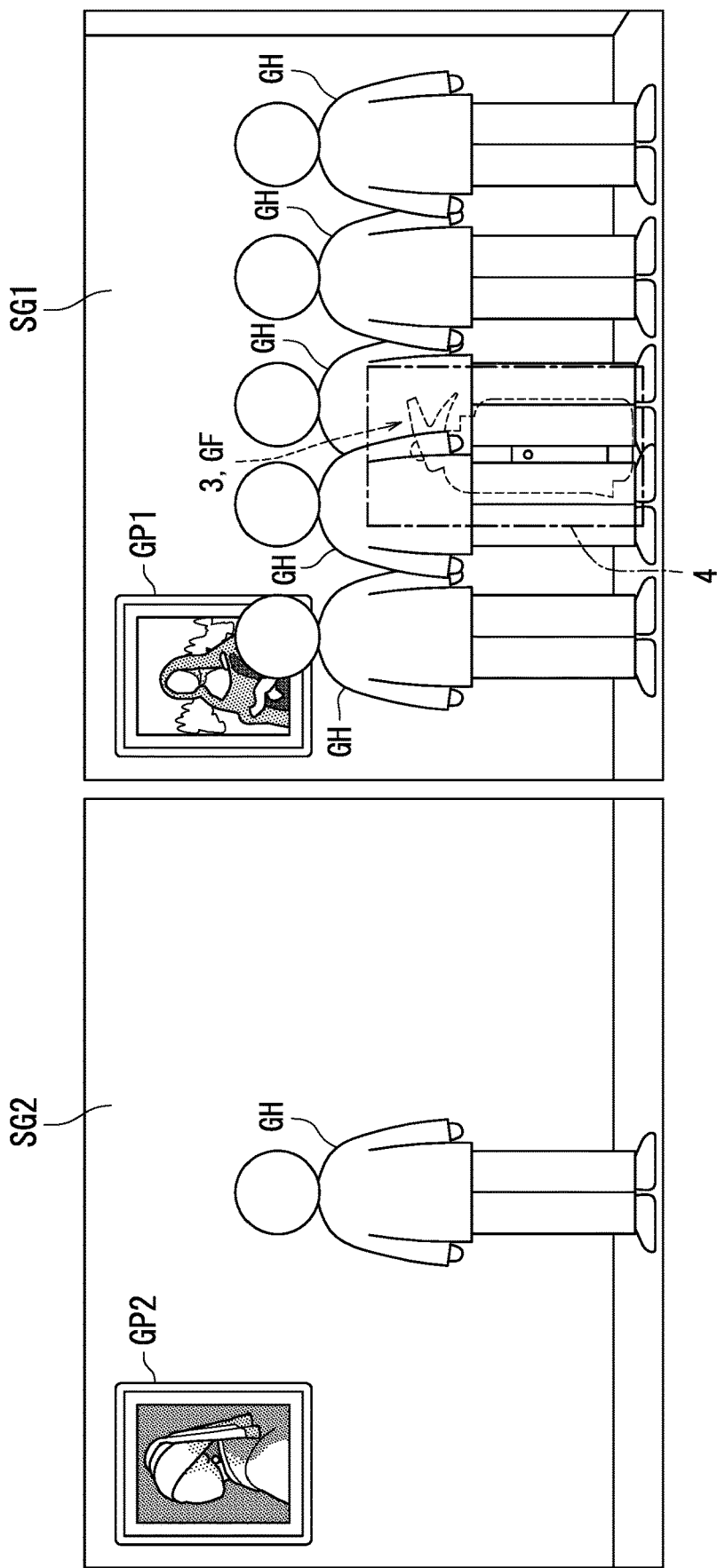
FIG. 14 is a diagram illustrating a second additional example of the first captured image and the second captured image according to the second embodiment of the present disclosure.

Continuing, the pre-event detection process according to the second embodiment will be described with reference to FIGS. 12 to 14. In FIGS. 12 to 14, the imaging obstruction act is detected as the pre-event. Note that a first flag 541 and a second flag 542 are both in an off state before the pre-event is detected.

FIG. 12 is a diagram illustrating an example of the first captured image SG1 and the second captured image SG2 according to the second embodiment. In the example illustrated in FIG. 12, the first captured image SG1 includes a first painting image GP1 and a fire extinguisher image GF. The second captured image SG2 includes a second painting image GP2 exhibiting a second painting. In other words, the first camera 1 captures an image of the first imaging area in which a fire extinguisher and a first painting are placed. The second camera 2 captures an image of the second imaging area in which the second painting is placed. In the present embodiment, the first imaging area and the second imaging area are adjacent but do not overlap with each other.

FIG. 13 is a diagram illustrating a first additional example of the first captured image SG1 and the second captured image SG2 according to the second embodiment. In detail, FIG. 13 illustrates the first captured image SG1 and the second captured image SG2 after a plurality of people have appeared in the imaging areas illustrated in FIG. 12 (first imaging area and second imaging area). FIG. 14 is a diagram illustrating a second additional example of the first captured image SG1 and the second captured image SG2 according to the second embodiment. In detail, FIG. 14 illustrates the first captured image SG1 and the second captured image SG2 after a plurality of people have appeared in the imaging area (first imaging area) illustrated in FIG. 12. In FIGS. 13 and 14, the first obstruction area rate D1 is equal to or greater than the first threshold because of the people appearing in the first imaging area. In FIG. 13, the second obstruction area rate D2 is equal to or greater than the first threshold because of the people appearing in the second imaging area. In FIG. 14, the second obstruction area rate D2 is less than the first threshold because only one person is in the second imaging area.

As illustrated in FIGS. 12 and 13, human body images GH illustrating a plurality of human bodies appear in the first captured image SG1 when the people appear in the imaging areas. When the people surround the detection target (fire extinguisher), the first captured image SG1 changes in a detection range 4. Accordingly, the camera controller 14 of the first camera 1 detects a change to the first captured image SG1 in the detection range 4 and transmits the change detection data to the device communication section 51 through the camera communication section 12 of the first camera 1.

The device controller 55 executes the event detection process when the device communication section 51 receives the change detection data in a similar manner as the first embodiment. In the example illustrated in FIGS. 13 and 14, the first flag 541 is in the off state. Accordingly, the device controller 55 executes the pre-event detection process. In detail, the device controller 55 calculates the first obstruction area rate D1 based on the first reference background data stored in the device storage 54 and the first captured image data, and determines whether or not the first obstruction area rate D1 is equal to or greater than the first threshold. In the example illustrated in FIG. 13, the first obstruction area rate D1 is equal to or greater than the first threshold.

In the present embodiment, the device controller 55 calculates the second obstruction area rate D2 based on the second reference background data stored in the device storage 54 and the second captured image data upon determining that the first obstruction area rate D1 is equal to or greater than the first threshold, and determines whether or not the second obstruction area rate D2 is equal to or greater than the first threshold. In the example illustrated in FIG. 13, a plurality of the human body images GH is included in the second captured image SG2 and the second obstruction area rate D2 is equal to or greater than the first threshold. Accordingly, the device controller 55 determines that the second obstruction area rate D2 is equal to or greater than the first threshold. In the present embodiment, the device controller 55 determines that the imaging obstruction act (pre-event) is not occurring upon determining that the first obstruction area rate D1 is equal to or greater than the first threshold and the second obstruction area rate D2 is equal to or greater than the first threshold.

As illustrated in FIG. 14 by contrast, the second captured image SG2 only includes one human body image GH. Accordingly, the device controller 55 determines that the second obstruction area rate D2 is less than the first threshold. In the present embodiment, the device controller 55 determines that the imaging obstruction act is occurring upon determining that the first obstruction area rate D1 is equal to or greater than the first threshold and the second obstruction area rate D2 is less than the first threshold. The device controller 55 also changes the first flag 541 from the off state to an on state upon determining that the first obstruction area rate D1 is equal to or greater than the first threshold and the second obstruction area rate D2 is less than the first threshold.

Figure 15:
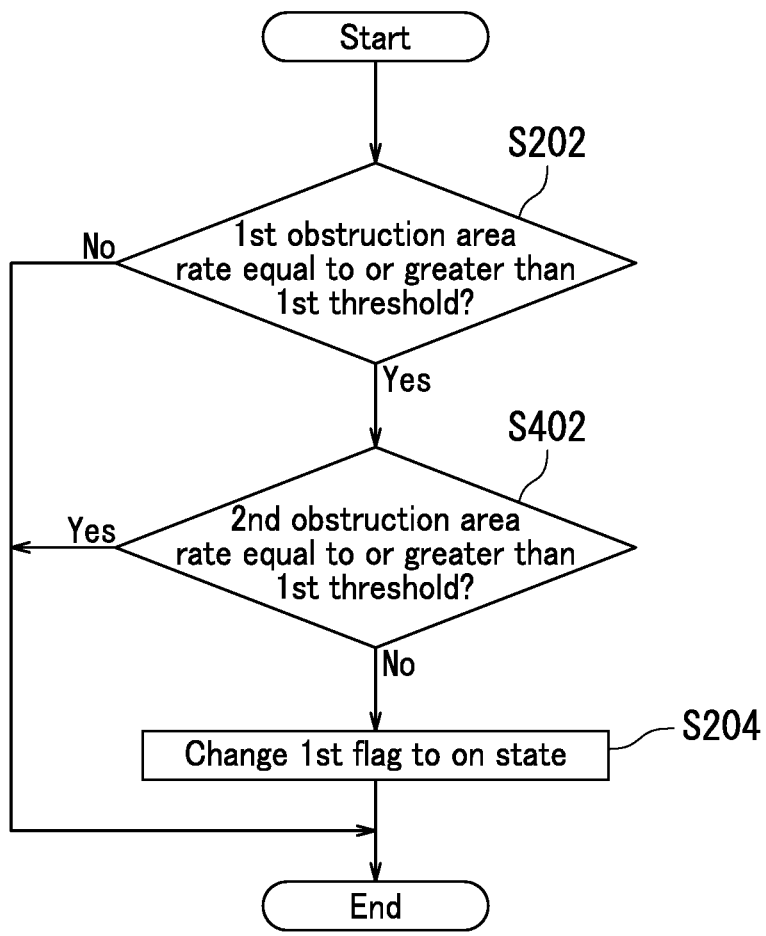
FIG. 15 is a flowchart illustrating a pre-event detection process according to the second embodiment of the present disclosure.

Continuing, the pre-event detection process according to the second embodiment will be further described with reference to FIG. 15. FIG. 15 is a flowchart illustrating the pre-event detection process according to the second embodiment. As illustrated in FIG. 15, the device controller 55 calculates the second obstruction area rate D2 based on the second reference background data and the second captured image data upon determining that the first obstruction area rate D1 is equal to or greater than the first threshold (Step S202: Yes) and determines whether or not the second obstruction area rate D2 is equal to or greater than the first threshold (Step S402). When determining that the second obstruction area rate D2 is equal to or greater than the first threshold (Step S402: Yes), or determining that the first obstruction area rate D1 is less than the first threshold (Step S202: No), the device controller 55 ends the pre-event detection process without changing the first flag 541 to the on state. Upon determining that the second obstruction area rate D2 is less than the first threshold by contrast (Step S402: No), the device controller 55 determines that the imaging obstruction act has been detected, changes the first flag 541 to the on state (Step S204), and ends the pre-event detection process.

The second embodiment has been described above. According to the present embodiment, the device controller 55 detects the pre-event based on the captured images of the cameras (first captured image SG1 and second captured image SG2). In detail, the device controller 55 detects the pre-event when the first obstruction area rate D1 is equal to or greater than the first threshold and the second obstruction area rate D2 is less than the first threshold. When the human body images GH are included in only the first captured image SG1 including a detection target image 3 (a plurality of people are in the first imaging area but only one person is in the second imaging area), probability that the imaging obstruction act for removing the detection target is occurring (people are crowding) is high. When a plurality of human body images GH is included in the first captured image SG1 and a plurality of human body images GH are included in the second captured image SG2 (captured image not including the detection target image 3) outside of the first captured image SG1 by contrast (a plurality of people are in the second imaging area), the probability that the people are gathering for a reason other than to remove the detection target is high. Accordingly, when the first obstruction area rate D1 is equal to or greater than the first threshold and the second obstruction area rate D2 is equal to or greater than the first threshold, in other words, a plurality of people is in both the first imaging area and the second imaging area, the device controller 55 does not determine that the imaging obstruction act is taking place and does not detect the pre-event. As a result, event detection accuracy can be improved.

Note that in the present embodiment, an example is described in which the first imaging area and the second imaging area do not overlap with each other, but the first imaging area and the second imaging area may overlap with each other.

Also in the present embodiment, an example is described in which the first imaging area and the second imaging area are adjacent, but the first imaging area and the second imaging area need not be adjacent.

The embodiments of the present disclosure have been described above with reference to the accompanying drawings (FIGS. 1 to 15). However, the present disclosure is not limited to the above embodiments and can be practiced in various ways within the scope not departing from the gist of the present disclosure. Furthermore, the configuration illustrated in the above embodiments is one example and not particularly limited. Various alterations are possible within a scope not substantially departing from the effects of the present disclosure.

For example, a configuration in which the consecutive event occurrence information is outputted to the output device 53 has been described in the embodiments of the present disclosure, but an administrator need only be notified of the consecutive event occurrence information. For example, the administrator may be notified by e-mail through the device communication section 51.

What is claimed is:
1. A monitoring system for detecting events, the monitoring system comprising:
   a first imaging device configured to capture an image of a first imaging area to generate first captured image data indicating a first captured image;
   a controller configured to detect the events based on the first captured image data;
   storage configured to store data indicating a first flag and a second flag; and
   a notifying section configured to notify of information, wherein
   the events include a pre-event and a post-event detected after the pre-event has ended,
   the first flag and the second flag are both in an off state before the pre-event is detected, and
   the controller
      changes the first flag from the off state to an on state upon detecting the pre-event,
      stores the first captured image data in the storage upon changing the first flag to the on state,
      holds the first flag in the on state even after the pre-event has ended,
      changes the second flag from the off state to the on state upon detecting the post-event, and
      directs the notifying section to notify of consecutive event occurrence information indicating that consecutive events have occurred.
2. The monitoring system according to claim 1, wherein the pre-event is an imaging obstruction act in which imaging is obstructed in the first imaging area.
3. The monitoring system according to claim 2, wherein the controller calculates a first obstruction area rate indicating what percentage of the first imaging area is occupied by a first obstruction area in which the imaging obstruction act is taking place, and detects the imaging obstruction act as the pre-event according to whether or not the first obstruction area rate is equal to or greater than a threshold.
4. The monitoring system according to claim 3, further comprising
   a second imaging device configured to capture an image of a second imaging area which differs from the first imaging area and generate second captured image data indicating a second captured image, wherein
   the controller detects the pre-event based on the first captured image data and the second captured image data.
5. The monitoring system according to claim 4, wherein
   the controller calculates a second obstruction area rate indicating what percentage of the second imaging area is occupied by a second obstruction area in which the imaging obstruction act is taking place, and
   the controller detects the pre-event when the first obstruction area rate is equal to or greater than the threshold and the second obstruction area rate is less than the threshold.
6. The monitoring system according to claim 1, wherein the post-event indicates a detection target removal act for a detection target placed in the first imaging area.
7. The monitoring system according to claim 6, wherein
   the storage further stores detection target information indicating whether or not the detection target is removable by an outside party, and
   the controller detects the post-event when the detection target information indicates that the detection target is removable by the outside party.

* * * * *